United States Patent [19]

Yoshida

[11] 4,433,856
[45] Feb. 28, 1984

[54] SPRING SEAT FOR SNOWMOBILE STRUT

[75] Inventor: Keisuke Yoshida, Cypress, Calif.

[73] Assignee: Yamaha Hatsudoki Kabushiki Kaisha, Iwata, Japan

[21] Appl. No.: 321,811

[22] Filed: Nov. 16, 1981

Related U.S. Application Data

[63] Continuation of Ser. No. 75,201, Sep. 12, 1979, abandoned.

[30] Foreign Application Priority Data

Sep. 29, 1978 [JP] Japan ................................. 53-120620
Nov. 30, 1978 [JP] Japan ................................. 53-148508

[51] Int. Cl.$^3$ ............................................. B60G 25/00
[52] U.S. Cl. .................................... 280/668; 180/190; 280/16; 280/21 R
[58] Field of Search ................ 280/12 R, 12 F, 21 R, 280/16, 668; 188/321, 322; 180/182, 190; 267/8 R, 33, 35

[56] References Cited

U.S. PATENT DOCUMENTS

| | | | |
|---|---|---|---|
| 3,504,752 | 4/1970 | Milward | 280/16 X |
| 3,977,485 | 8/1976 | West et al. | 180/190 X |
| 4,200,307 | 4/1980 | Szabo | 280/668 |

Primary Examiner—Robert J. Spar
Assistant Examiner—Donald W. Underwood
Attorney, Agent, or Firm—Donald D. Mon

[57] ABSTRACT

A strut-type suspension for the steering ski of a snowmobile. The suspension includes a fixed tube attached to the chassis, and a movable tube axially movable in the fixed tube. A bias spring is mounted in compression between the movable tube and a spring seat attached to structure fixed to the chassis, which spring seat overhangs the movable tube. A shaft supporting a piston fitted in a cylinder inside the movable tube is linked to the spring seat by alignment means which permit shear-like relative movement between the shaft and the fixed tube.

15 Claims, 2 Drawing Figures

SPRING SEAT FOR SNOWMOBILE STRUT

CROSS-REFERENCE TO OTHER PATENT APPLICATION

This is a continuation of applicant's co-pending U.S. patent application Ser. No. 075,201, filed Sept. 12, 1979 entitled "Spring Seat for Snowmobile Strut", which is abandoned.

FIELD OF THE INVENTION

This invention relates to strut-type suspension means for the steering ski of snowmobiles and in particular to a seat structure for a bias spring therein.

BACKGROUND OF THE INVENTION

Snowmobiles having steerable front skis utilize struts which include a movable tube for support of the forward end of the chassis. The movable tube is slidably supported in a stationary tube, the stationary tube being rigidly attached to the chassis. A steering ski is attached to the lower end of the movable tube. A spring is provided to bias the movable tube downwardly, and the spring requires a seat to support its biasing action. The seat, of course, must be fixed to the chassis.

It is conventional for the spring seat to be formed in an upper portion of the movable tube to provide the said bias, but then there arises the problem that the construction of the conventional chassis of the snowmobile must be drastically changed. For an example of such changes, reference may be had to U.S. Pat. No. 3,977,485. The size of the chassis itself must frequently be enlarged to provide an upper spring seat, because there is no reinforcement inherently provided in the upper portion of the chassis. Moreover, if the cushioning stroke of the steering ski is considerably elongated, the location of the upper spring seat must still further be raised, thereby still further to enlarge the size of the chassis.

It is an object of this invention to provide a strut-type steering ski suspension which does not require any substantial change in the chassis construction of the snowmobile itself.

Yet another object of the invention is to compensate for misalignment between the stationary tube and the receiver of a piston rod in such a strut assembly.

BRIEF DESCRIPTION OF THE INVENTION

A strut assembly according to this invention is provided with a fixed tube which is attached to the chassis and which supports a movable tube for axial movement. A piston fits in the movable tube and is fixed to structure attached to the chassis, to exert a dampening action. Orifices are provided to permit energy consuming restricted flow across the piston. The movable tube is biased downwardly by a spring which bears against the movable tube. According to this invention, a spring seat is fixed to the fixed tube, and the upper end of the spring seat is disposed so as to buttress the upper end of the spring. This seat may be removably attached to the fixed tube, and if desired can be a fluid tight cylinder.

According to a preferred but optional feature of the invention, the spring seat includes a resilient member which permits shear-like lateral movement of the piston shaft to compensate for misalignment when parts of the strut are out of alignment.

The above and other features of this invention will be fully understood from the following detailed description and the accompanying drawings in which:

DETAILED DESCRIPTION OF THE INVENTION

Figure 1:
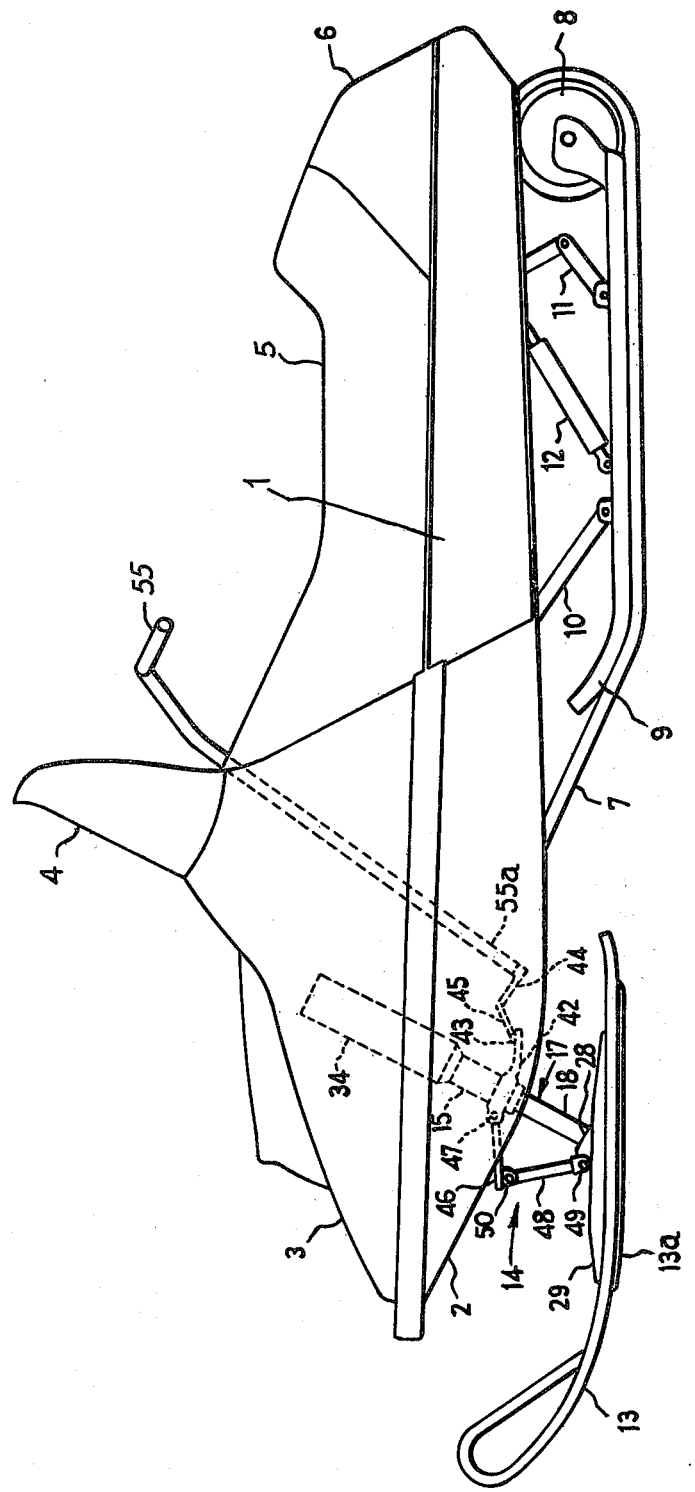
FIG. 1 is a side elevation of a snowmobile incorporating this invention.

In FIG. 1, reference numerals 1, 2 and 3 indicate a chassis, a bottom cover covering the lower front of the chassis 1, and a shroud covering the upper front of the chassis 1, respectively. A windshield 4, a driver's seat 5, a luggage box 6, a pair of endless tracks 7 (which will be shortly referred to as tracks), a pair of guide wheels 8 tensing the tracks 7 backward, and a pair of slide rails 9 are connected to the chassis. Each of slide rails 9 is arranged to contact with the inner side of the corresponding track 7, and is mounted to the aforementioned chassis 1 through links 10 and 11, a shock absorber 12 and a spring (not shown) in such a manner that the track 7 will be elastically held. The front end of track 7 runs on a sprocket wheel (not shown) so that the driving force of a prime mover is transmitted thereto through a centrifugal type stepless reduction gear mechanism and the sprocket wheel.

A pair of steering skis 13 are arranged below bottom cover 2. These steering skis 13 are suspended vertically elastically by means of a suspension assembly 14, which will be described in detail later, and are steered to the right and left at a varying steering angle by means of steering handlebars 55. A metal runner 13a is secured to the sliding surface of each of the skis 13.

Figure 2:
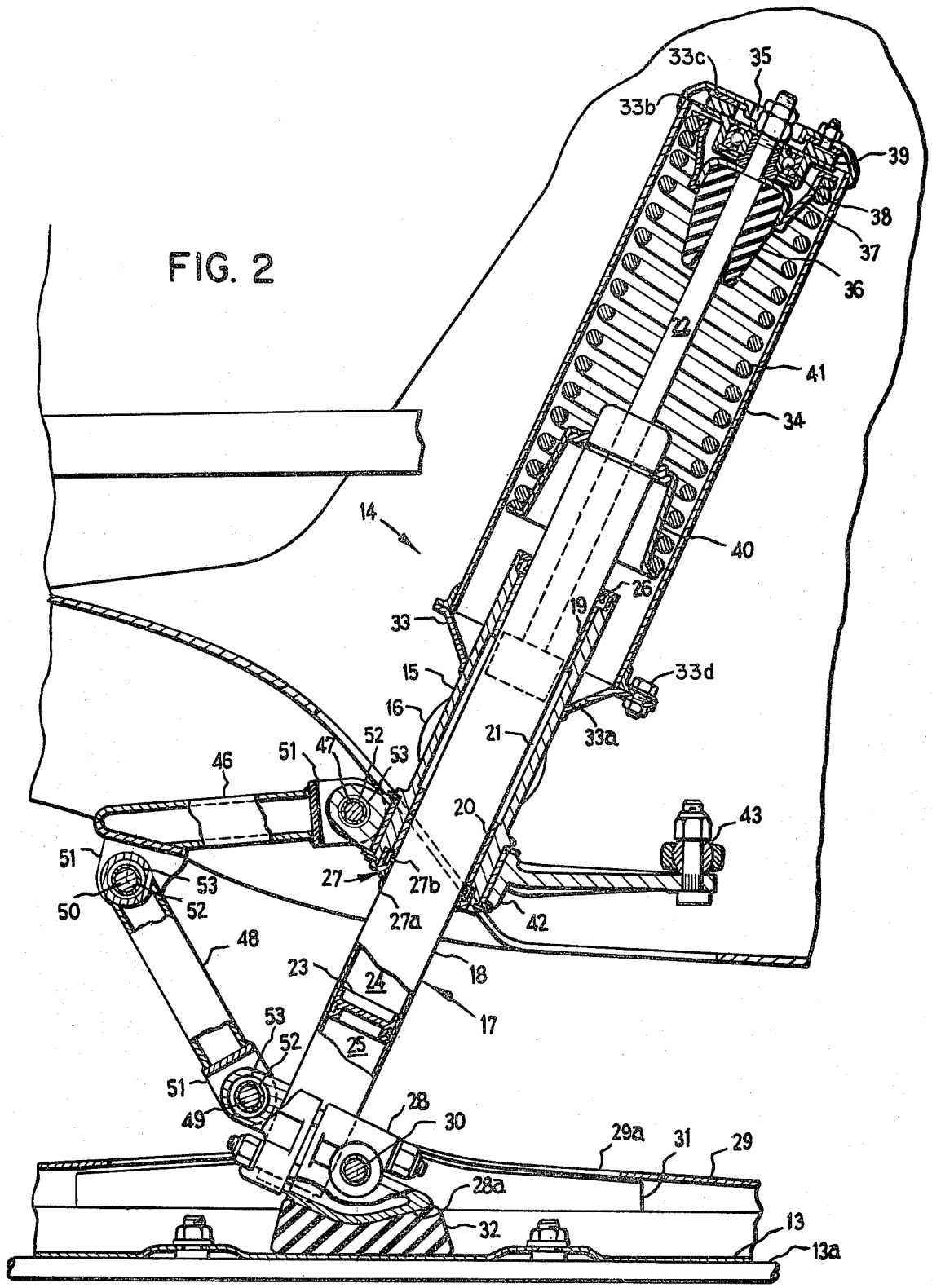
FIG. 2 is a side elevation, partly in cutaway cross-section, showing the presently preferred embodiment of the invention.

Suspension assembly 14 is held, as best seen in FIG. 2, in a stationary cylinder 15 (sometimes called a "fixed tube") which is fixed to the front extension of the aforementioned chassis 1. More specifically, the stationary cylinder 15 is fixed, while having its center axis slightly inclined backward, to both ends of a member 16 which extends transversely, and constitutes a portion of chassis 1. A strut or hydraulic shock absorber 17 is received in the stationary cylinder thus constructed. That is to say, in the embodiment being described, the strut adapted to slide within the stationary cylinder 15 is made capable of acting as the shock absorber 17. Cylinder 18 (sometimes called a "movable tube" or "plunger" is embraced, aligned, and laterally restrained by means of a pair of upper and lower bearings 19, 20 so that the cylinder 18 can rotate and move up and down. It is directed downwardly and forwardly relative to the chassis. The space which is defined by the inner wall of the stationary cylinder 15 and the outer wall of the cylinder 18 between bearings 19 and 20 forms a grease chamber 21.

Shock absorber 17 is of the pneumatic type, with its piston rod 22 protruding upward. As a result, a slidable and axially unrestrained free piston 23 within cylinder 18 is located at a lower position of the shock absorber 17, and a pre-pressurizing gas chamber 25, isolated from an oil chamber 24 by the free piston 23 is located at the lower end of the movable tube. Pre-pressurizing gas chamber 25 is charged with nitrogen gas under high pressure (e.g., 15 to 25 kg/cm$^2$) so that the increase in the volume of the oil chamber 24 accompanying the entry of the piston rod 22 into the cylinder 18 is compensated by the movement of the free piston 23 and so that a preload in the extending direction is imparted to the piston rod 22. The lowered end of cylinder 18 is reduced to a joint for a bracket 28 (sometimes called a "gusset"), and its lowermost end face is formed with a port for filling gas into gas chamber 25.

In the upper end of the stationary cylinder 15, there is mounted a seal member 26 for sealing the gap between cylinders (tubes) 15 and 18. Another seal member 27 for sealing this gap is mounted in the lower end of the stationary cylinder 15. Seal member 27 comprises a downwardly extending lip 27a for repelling ice and an upwardly extending lip 27b acting as an oil seal. Since that portion of the cylinder, which is located below the stationary cylinder 15, is exposed to the outside, that portion will be attached by snow or ice especially during parking. As has been mentioned above, seal member 27 is formed with the ice repelling lip 27a in addition to the oil sealing lip 27b so that oil sealing lip 27b is protected from damage by ice, thereby to increase the durability of the seal member 27. Since, moreover, cylinder 18 has its pre-pressurizing gas chamber 25 located at a low position where it will be exposed to the outside, the cooling effects obtainable are excellent. More specifically, the temperature of the shock absorber 17 is raised during the running operation of the snowmobile. As a result of this temperature rise, the nitrogen gas expands more than the oil because of its higher coefficient of cubic expansion. By cooling the gas chamber 25 variation in the preload to be imparted to the piston rod 22 due to temperature variation is minimized.

Also, the portion of the movable tube below the fixed tube that contains oil is cooled. This reduces viscosity variations caused by variations in temperature, and tends to stabilize the dampening operation of the shock absorber.

Skis 13 are pivotally (tiltably) connected to the lower end of cylinder 18. More specifically, a bracket (gusset) 28 is fixed to the lower end of cylinder 18. A cover 29 having a generally dome-shaped section is secured to the ski 13. Thus, bracket 28 is pivotally supported by means of a pivot pin 30 such that it is located within the opening 29a which is formed in the cover 29. Incidentally, there is interposed between cover 29 and bracket 28 a reinforcement 31 which is secured to the inner side of the cover 29. On the other hand, bracket 28 has its lower side 8a bulging downward, and a resilient member (Sometimes called a "cushion") is sandwiched between the bulging lower side 28a and the ski 13. As a result, the ski 13 is biased to return to its horizontal position.

There is secured to the outer circumference of the aforementioned stationary cylinder 15 a flange 33 which has an upwardly diverging and generally funnel-shaped cross-section. This flange 33 is joined by releasable fasteners 33d ("attachment means) to the open end of a cylinder 34 (restraint means"). The flange 33 is formed with a drain hole 33a for an air vent and drain port. On the other hand, cylinder 34 has at the center of its upper end face an opening 35 therethrough, which faces the upper end of piston rod 22. A bearing 38 has its inner face fixed to the upper end portion of piston rod 22. A stopper 36(buffer) made of a resilient material and a spring seat 37 (spring seat 37 is structure axially restrained with respect to fixed tube 34) and its outer race are jointed to the upper end face of spring 34 through an annular elastic member 39 ("compression bearing means") which is shrink-fitted therein. A second shoulder 33b is formed on structure attached to the outer race of the bearing. A first shoulder 33c is formed on tube 34. The shoulders bear against compression bearing means 39. The second shoulder comprises two parts joined by the bearing 38. The inner part is mounted to the rod, and the rod is thereby rotatable relative to tube 34. Shoulders 33b and 33c, member 39, and bearing 38, are sometimes collectively referred to as "mounting means". As a result, the piston rod 22 is held rotatably at the side of the chassis 1. Thanks to the interposition of the elastic member 39, the possible misalignment between the bearings 19 and 20 and the piston rod 22 due to the vertically telescopic movements of the cylinder 18 can be compensated. Member 39 permits limited lateral shear-like movement between the upper end face of cylinder 34 and the upper end of the piston rod. A spring seat 40 is held on the upper portion of cylinder 18 so that a coiled compression spring 41 is retained in compression between spring seat 40 and the other spring seat 37 at the side of the piston rod 22. Since, in that way, the piston rod 22 is held at the side of the chassis 1, it follows that the compression spring 41 is retained between the cylinder 18 and a portion of chassis 1.

Reference numeral 42 indicates a steering arm with a collar which is mounted rotatably on the outer circumference of the lower portion of fixed tube 15. Steering arm 42 has a portion extending rearwardly, and which carries a ball joint 43. Reverting to FIG. 1, a pitman arm 44 is fixed to the lower end of the handle column 55a of the handle 55 and has its rotatable end connected to the ball joint 43 of the steering arm 42 by means of a tie rod 45.

A link 46 is connected pivotally to the front side of the arm 42 (and to its collar) by means of a pivot arm 47, which is arranged at a right angle with respect to the center axis of shock absorber 17, and substantially in parallel with the pivot pin 30 of the aforementioned ski 13. Another link 48 is connected pivotally to the front side of bracket 28, which is mounted on the lower end of the movable to (or plunger), by means of a pivot pin 49. Those two links 46 and 48 are connected pivotally to each other by means of still another pivot pin 50. These pivot pins 49 and 50 are arranged in parallel with the aforementioned pivot pin 47, and all are perpendicular to a plane which includes the forward axis of the ski and the central axis of the movable tube (plunger). The connecting portions of pivot pins 47, 49 and 50 are made to have the construction shown in FIG. 1. Although the connecting portion of pivot pin 49 is not shown in FIG. 1, it has similar construction to those of the other pivot pins. Incidentally, reference numerals 52 and 53 indicate a collar and a metal bearing, respectively.

In operation, when the aforementioned steering handlebars 55 are turned, the steering arm 42 is turned through the pitman arm 44, the tie rod 45 and the ball joint 43. Since the links 46 and 48 are connected to the front side of the steering arm 42 by means of the pivot pins 47 and 50 arranged at a right angle with respect to the shock absorber 17, they are going to rotate. On the other hand, since the aforementioned cylinder 18 and the piston rod 22 are held rotatably in the stationary cylinder 15 and the bearing 38, respectively, not only the bracket 28 at the lower end of the cylinder 18 but also the ski 13 are turned, together with the movable tube. Since, moreover, the aforementioned link 48 is pivotally connected at its lower end to the bracket 28 by means of the pivot pin 48 which is in parallel with the pivot pins 47 and 50, the steering arm 42 and the ski 13 are turned together.

On the other hand, since the cylinder 18 of the shock absorber 17 is held telescopically in the stationary cylinder 15 such that its upper end portion is supported elastically by the compression spring 41, the ski 13 can move up and down along the center axis of the shock absorber 17 together with cylinder 18. At this time, the spacing between the steering arm 42 and the bracket 28 is so changed that the pivot pins of the links 46 and 48 accordingly rotate. Since, in this instance, the pivot pins 47, 48 and 50 are arranged to intersect the center axis of the shock absorber 17 at a right angle, the links 46 and 58 move in the plane extending through that center line (i.e., in the plane in parallel with the surface of the sheet printed with FIG. 1) so that the steering angle of the ski 13 can be prevented from varying even if the ski 13 moves up and down.

As has been described, in a snowmobile equipped with a strut type steering ski suspension assembly according to the present invention, both the fixed tube holding the strut, and the steering arm made coactive with the steering handlebars, are pivotally supported on the center axis of the strut, and the links connecting the steering arm and the steering ski are arranged in front of the strut. As a result, those links are arranged in front of the exposed portions below the strut so that these exposed portions can be prevented from colliding against an obstacle, if any, which comes out of the snow surface while the snowmobile is running. The exposed portions are thereby protected from being damaged. This ensures smooth relative movements between the stationary cylinder and the strut thereby to extend the lifetime of the suspension assembly although those exposed portions not only move into and out of the stationary cylinder, but also rotate in the same. Since, moreover, the links always face in the running direction of the snowmobile, the sliding surface of the strut is protected.

This invention is not to be limited by the embodiment shown in the drawings and described in the description, which is given by way of example and not of limitation, but only in accordance with the scope of the appended claims.

I claim:

1. In a strut-type suspension for supporting part of the chassis of a vehicle, said suspension including a fixed tube mountable to said chassis, a bearing inside said fixed tube, a movable tube slidably mounted in said bearing, said movable tube and bearing having cylindrical engaging walls with respective axes, and being coaxial, a smooth cylindrical surface in said movable tube forming a cylinder, a piston slidably fitted in said cylinder, and a rod attached to said piston and extending beyond one end of said movable tube in fluid sealing sliding contact therewith, the other end of said cylinder being closed, the improvement comprising:
    restraint means comprising a tubular member surrounding said rod;
    attachment means releasably attaching said restraint means to said fixed tube, said restraint means being structurally attached to said chassis only through said fixed tube;
    mounting means detachably mounting said piston rod to said restraint means; and
    bias means opposed to compression between said movable tube and structure axially restrained with respect to said fixed tube.

2. Apparatus according to claim 1 in which said mounting means includes a first shoulder, and a second shoulder which laterally interferes with said first shoulder, compression bearing means between said shoulders, said compression bearing means permitting limited relative lateral shear-like movement between said shoulders, said piston rod being linked to said second shoulder.

3. Apparatus according to claim 2 in which said compression bearing means comprises elastomeric material.

4. Apparatus according to claim 2 in which said mounting means includes a spring retainer collar surrounding said piston rod against which said bias means bears.

5. Apparatus according to claim 4 in which said mounting means further includes a snubber surrounding said piston rod which is backed up by said spring retainer collar.

6. Apparatus according to claim 2 in which said second shoulder is formed of two concentric parts joined by a bearing that is coaxial with said piston rod, whereby to permit rotary movement between said piston rod and said retainer means.

7. Apparatus according to claim 6 in which said compression bearing means comprises elastomeric material.

8. Apparatus according to claim 2 in which said restraint means is tubular and surrounds said piston rod, said first shoulder having a central aperture therethrough.

9. Apparatus according to claim 8 in which threaded fastener means is included in said mounting means to connect said piston rod to said second shoulder.

10. Apparatus according to claim 8 in which said compression bearing means comprises elastomeric material.

11. Apparatus according to claim 10 in which said mounting means includes a spring retainer collar surrounding said piston rod against which said bias means bears.

12. Apparatus according to claim 11 in which said mounting means further includes a snubber surrounding said piston rod which is backed up by said spring retainer collar.

13. Apparatus according to claim 12 in which said second shoulder is formed of two concentric parts joined by a bearing that is coaxial with said piston rod, whereby to permit rotary movement between said piston rod and said retainer means.

14. In a strut-type suspension for supporting part of the chassis of a vehicle, said suspension including a fixed tube mountable to said chassis, a bearing inside said fixed tube, a movable tube slidably mounted in said bearing, said movable tube and bearing having cylindrical engaging walls with respective axes, and being coaxial, said movable tube being slidably mounted in said bearing, the improvement comprising:
    restraint means comprising a tubular member attached to said fixed tube and surrounding said movable tube above said fixed tube;
    attachment means releasably attaching said restraint means to said fixed tube, said restraint means being structurally attached to said chassis only through said fixed tube; and
    bias means opposed in compression between said movable tube and stucture axially restrained with respect to said fixed tube.

15. Apparatus according to claim 14 in which said restraint means is tubular, and has a laterally-extending shoulder for opposition to said bias means.

* * * * *